No. 741,163. PATENTED OCT. 13, 1903.
I. C. PUTNAM.
TOBACCO LATH.
APPLICATION FILED JAN. 19, 1903.
NO MODEL.
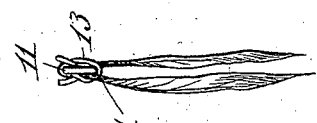
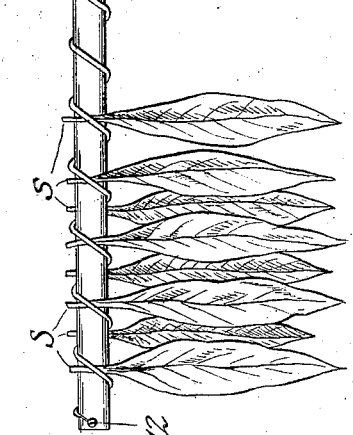
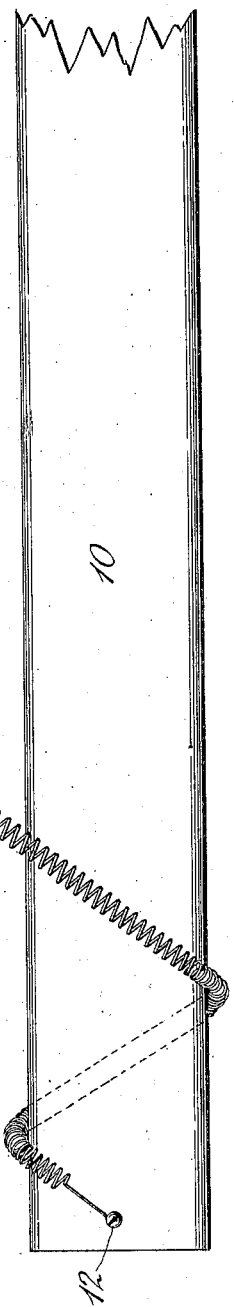
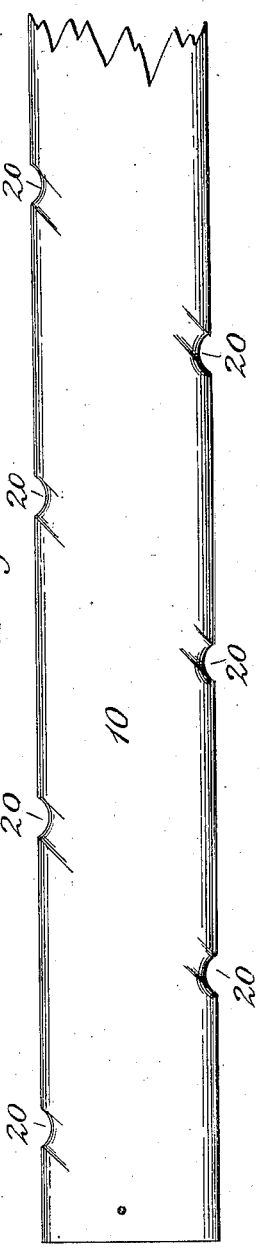
Witnesses:
J. J. Looney
G. W. Rourke
Inventor:
I. C. Putnam,
By his Attorney
Chas. F. Schmelz No. 741,163. Patented October 13, 1903.

UNITED STATES PATENT OFFICE.

ISRAEL C. PUTNAM, OF EAST HARTFORD, CONNECTICUT, ASSIGNOR TO HIMSELF AND FREDERICK H. COMSTOCK, OF EAST HARTFORD, CONNECTICUT.

TOBACCO-LATH.

SPECIFICATION forming part of Letters Patent No. 741,163, dated October 13, 1903.

Application filed January 19, 1903. Serial No. 139,563. (No model.)

*To all whom it may concern:*

Be it known that I, ISRAEL C. PUTNAM, a citizen of the United States, and a resident of East Hartford, in the county of Hartford and State of Connecticut, have invented certain new and useful Improvements in Tobacco-Laths, of which the following is a full, clear, and exact specification.

This invention relates to tobacco laths or strips for supporting tobacco during the curing or drying period; and it has for one of its objects the provision of a device whereby the tender plants or leaves may be held in suspension in such a manner that the air may circulate freely between the individual leaves, while at the same time the air may have free access to the stems of the leaves, so that all liability of rotting will be entirely obviated.

My invention has, furthermore, for its object the provision of a device of this character which will permit the instant removal of the dried leaves therefrom and without any liability of tearing or otherwise damaging the same.

A further object of the invention may be formed in the particular construction of the holding device, as will be hereinafter described, and as is illustrated in the accompanying drawings, in which—

Figure 1 shows my improved tobacco-lath in use. Fig. 2 is an end view looking from the right of Fig. 1. Fig. 3 illustrates in detail the lath and the holder, and Fig. 4 shows a modification of the lath.

In order to understand clearly the particular purposes and requirements which my improved lath is designed to fulfil, a brief statement relative to the art may not be out of order, more especially so since the device is particularly adapted for use in connection with plants or leaves which are raised under canvas or cotton cover and are for this reason generally designated as "shade-grown."

The price which tobacco commands when placed on the market depends, as a matter of course, upon the texture and quality of the leaf, so that great pains are taken in raising a healthy and uniform crop. In order to do this, the method of cutting off the entire stalk as soon as some of its leaves mature or become "ripe" is not now followed out; but each ripe leaf is taken from the stalk separately, thus leaving the others to mature in due time, and therefore giving the stalk an opportunity to be full productive. The leaves after being cut are usually pierced and strung on a line, the ends of which are held on a "lath" or wooden strip. Now it is self-evident that the work of "stringing" occupies a great amount of time and that, furthermore, the punctures in the leaves are rather a detriment on account of the liability of tearing and breaking, while the process of "unstringing" is necessarily a lengthy and painstaking one.

It is the particular object of my present invention to obviate the objections enumerated above and to provide a device which is simple in construction, is easily manipulated, and the first cost of which is no more or even less than that of the devices generally used.

In the accompanying drawings, in which similar characters denote similar parts, 10 represents a bar or lath substantially rectangular in cross-section and having its edges rounded, as shown at 11. Secured to both ends of the strip 10, as at 12, is a resilient binding member 13, which is wound around the lath 10 a certain number of times, so as to leave in actual practice about two and one-half inches between the successive coils and the tightness of which depends, of course, upon its length relative to that of the lath 10 and also upon the number of windings around the same.

While primarily it is immaterial of what the nature of the resilient member 13 may be, I preferably employ a non-corrosive wire spring which is tensioned sufficiently to permit the ready insertion and removal of a tobacco-leaf between it and the lath 10. The manner in which the leaves are supported is clearly illustrated in Figs. 1 and 2, in which the stems S are shown frictionally held between the member 13 and the lath 10, both sides of the latter being in use, while the convolutions of the binder 13 at opposite sides of the lath will bring the leaves disposed on one side of the lath into positions intermediate those on the other side. Likewise it will be observed by referring to Fig. 2 that ample clearance is afforded between the leaves transversely of the lath, so that the air may freely circulate between them, and the process of curing and drying will for that reason take place rapidly.

Practice has demonstrated that a solid elastic band as a binder in connection with the lath 10 will prove troublesome in causing the stem to rot where it is covered by the band on account of the air being unable to reach the stem, so that a binder consisting of a spring, as shown in Fig. 3, is by far the best, since the wire is small and the coils are open to permit free access of air to the stem.

When the leaves are dry, they may be removed from the lath by laying the device flat on a table and placing a board over the leaves to hold the latter against the table, whereupon the lath itself may be pushed from all the leaves at once.

In Fig. 4 is shown a modification of the bar 10, which in this instance is provided with notches 20, adapted to receive the binder 13, and will therefore maintain the consecutive coils thereof in proper positions.

Having described my invention, what I claim as new is—

1. The combination, with a bar; of a unitary resilient binder coöperative with the opposite sides of said bar, alternately.

2. The combination, with a bar; of a resilient binder wound spirally around said bar.

3. The combination, with a bar having notches in its opposite edges; of a resilient binder wound spirally around said bar and resting in said notches.

ISRAEL C. PUTNAM.

Witnesses:
F. H. COMSTOCK,
CHAS. F. SCHMELZ.